United States Patent
Lee (10) Patent No.: US 8,749,095 B2
(45) Date of Patent: Jun. 10, 2014

(54) UNINTERRUPTIBLE POWER SUPPLY SYSTEM AND POWER MANAGEMENT METHOD THEREOF SUITABLE FOR AUDIO VISUAL APPARATUS

(75) Inventor: Yu-Lung Lee, Miaoli County (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 820 days.

(21) Appl. No.: 12/916,726

(22) Filed: Nov. 1, 2010

(65) Prior Publication Data

US 2012/0032516 A1 Feb. 9, 2012

(30) Foreign Application Priority Data

Aug. 9, 2010 (TW) .............................. 99126498 A (51) Int. Cl.
*H02J 7/00* (2006.01)
*H02J 9/00* (2006.01)

(52) U.S. Cl.
USPC ........................................................ 307/66

(58) Field of Classification Search
USPC ........................................................ 307/66
See application file for complete search history.

(56) References Cited

U.S. PATENT DOCUMENTS

| 6,917,124 B2* | 7/2005 | Shetler et al. | 307/66 |
| 2010/0301675 A1* | 12/2010 | Chen et al. | 307/66 |

FOREIGN PATENT DOCUMENTS

| JP | H04-289739 A | 10/1992 |
| JP | H08-272489 A | 10/1996 |
| JP | 2002-135997 A | 5/2002 |
| JP | 2009-118630 A | 5/2009 |

OTHER PUBLICATIONS

Communication From the Taiwan Patent Office Regarding a Counterpart Foreign Application Dated (Taiwan Year 102) Apr. 1, 2013.

* cited by examiner

*Primary Examiner* — Hal Kaplan
(74) *Attorney, Agent, or Firm* — Rosenberg, Klein & Lee (57) ABSTRACT

An uninterruptible power supply system (UPS) and a power management method thereof suitable for an audio visual apparatus are provided. The uninterruptible power supply system includes a power management unit, a wireless transceiver module and a current detecting unit, wherein the current detecting unit is coupled to an output of the power management unit to detect a load current output from the UPS system. The UPS is capable of receiving and learning a wireless command code in an infrared ray (IR) remote control signal. When the UPS system detects a multimedia system connected thereto is turned on and the UPS system is in a lower power state, the UPS system sends command code to turn off the multimedia system to avoid the damage of the multimedia system during power failure.

12 Claims, 7 Drawing Sheets

UNINTERRUPTIBLE POWER SUPPLY SYSTEM AND POWER MANAGEMENT METHOD THEREOF SUITABLE FOR AUDIO VISUAL APPARATUS

BACKGROUND OF THE INVENTION

1. Field of the Invention

The present invention is related to an uninterruptible power supply system, and more particular to an uninterruptible power supply system and a power management method suitable for an audio visual apparatus.

2. Description of Related Art

Uninterruptible power supply systems (UPS hereafter) are mainly classified into three types: on-line UPS, off-line UPS and line-interactive UPS. Recently, more and more audio visual apparatuses are provided with complicated operation and network functions maintained by stable power supply which are accomplished by the UPS. Since the power supply period of the UPS is usually limited, if the audio visual apparatus cannot be turned off within the power supply period of the UPS, damage may occur.

SUMMARY OF THE INVENTION

The object of the present invention is to provide an UPS and a power management method suitable for an audio visual apparatus. When the mains (also called commercial power or line power) fails, if the audio visual apparatus is on and a battery status of the UPS reaches a default value, the UPS sends a command code via a wireless transceiver module to control the audio visual apparatus.

In one aspect, when the UPS detects the audio visual apparatus being on and the battery status reaches the default value, the UPS sends a second command code to turn off the audio visual apparatus so that the audio visual apparatus may be turned off before the battery energy runs out.

In another aspect, when the UPS detects the recovered mains, the UPS sends the second command code again to reboot the audio visual apparatus and supply power to the audio visual apparatus.

Yet, in another aspect, the UPS of the invention is applicable for all types of remote controllers. Once the remote controller sends a command code, the UPS is booted without exceptions.

The power management method of the invention prevents the audio visual apparatus being turned off when the audio visual apparatus is still on.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

First Embodiment

Figure 1:
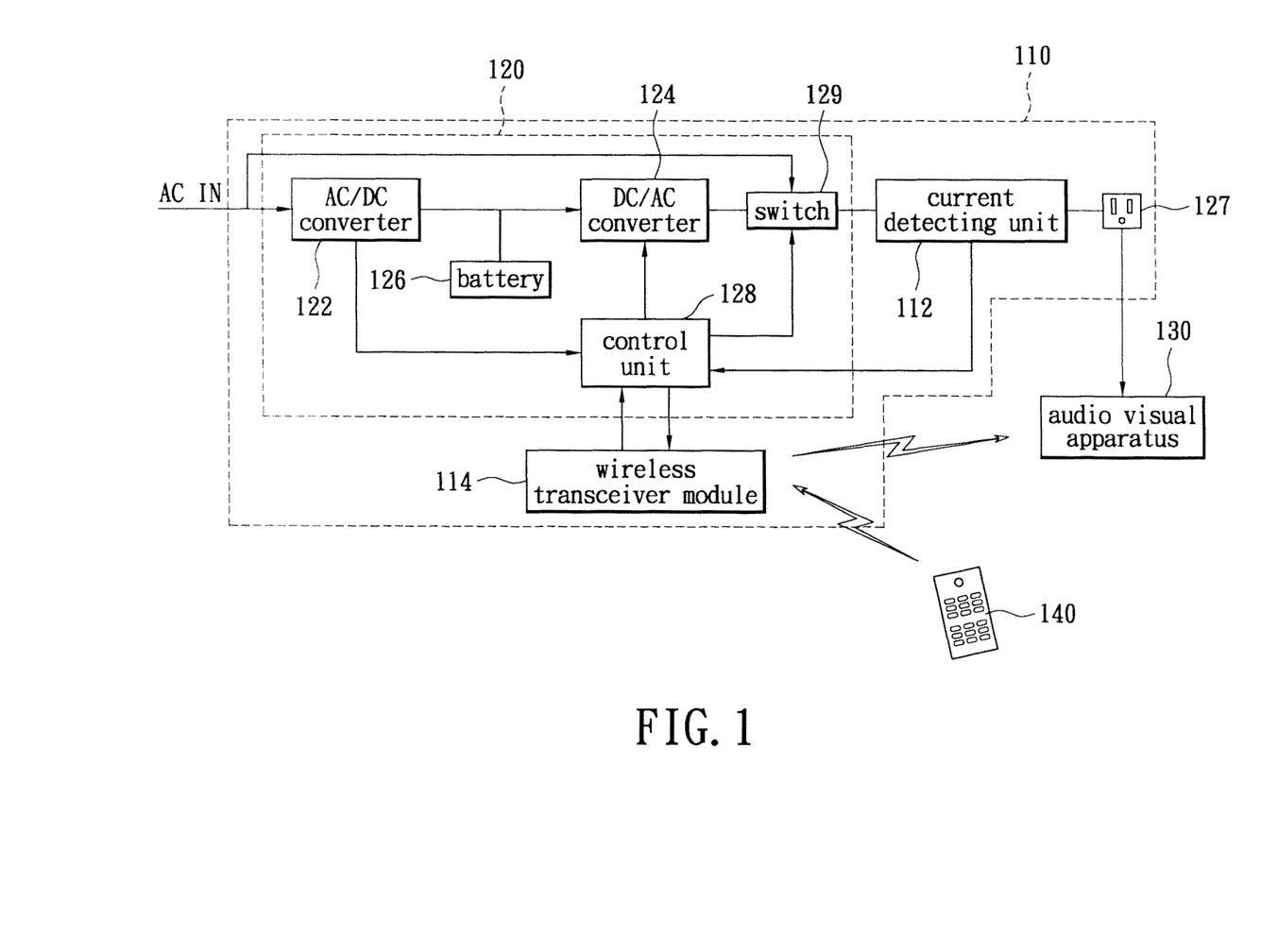
FIG. 1 is a block diagram showing the first embodiment of a UPS of the invention for an audio visual apparatus.

Referring to FIG. 1, an UPS 110 is disposed between an audio visual apparatus 130 and an AC power source (AC IN). The UPS 110 includes a power management unit 120, a wireless transceiver module 114 and a current detecting unit 112. The power management unit 120 is coupled to the wireless transceiver module 114 and the current detecting unit 112 and receives power from the AC power source (AC IN). The power management unit 120 further comprises an AC/DC converter 122, a DC/AC converter 124, a battery 126, a control unit 128 and a switch 129. The battery 126 is coupled to the AC/DC converter 122 and the DC/AC converter 124. The switch 129 is coupled to an output of the DC/AC converter 124, the current detecting unit 112 and the AC power source (AC IN) and controlled by the control unit 128 to switch power supply mode. The control unit 128 is coupled to the AC/DC converter 122, the DC/AC converter 124, the switch 129, the current detecting unit 112 and the wireless transceiver module 114.

The AC/DC converter 122 converts the AC power to DC power and charges the battery 126. The DC power is converted to AC power by the DC/AC converter 124 and output to an audio visual apparatus 130 via a power output port 127. The current detecting unit 112 and the switch 129 are between the DC/AC converter 124 and power output port 127. The switch 129 is, for example, a three-ends switch element or a multiplexer and controlled by a control unit 128 to switch power supply routes. Thus, the output power of the UPS 110 may selectively from the AC power source or converted from the battery 126. The current detecting unit 112 detects load current output from the UPS 110, which is also the consumed current of the audio visual apparatus 130. The power management unit 120 determines that the audio visual apparatus 130 is on or off according to the detected load current. For example, when the load current output from the UPS 110 exceeds a default value, it is indicated that the audio visual apparatus 130 is on. When the load current is zero or smaller than the default value, it is indicated the audio visual apparatus 130 is off.

The wireless transceiver module 114 is, for example, an infrared module, a RF module, a RF4CE module or a Bluetooth module to receive control signals from a controller 140 and send control signals to control the audio visual apparatus 130. In this embodiment, a first command code and a second command code are saved in the UPS 110. The first command code is used to control the UPS 110 on and off, and the second command code is used to control the audio visual apparatus 130 off. The first and second command codes can be defined and saved in the control unit 128 by a manufacturer in advance, input manually by a user. The first and second command codes can also be defined by a user or learned by the UPS 110 via the wireless transceiver module 114 from a remote controller 140 operated by a user and saved in the control unit 128. The UPS 110 is controlled to be on or off according to the first command code from the remote controller 140 operated by a user.

When the UPS 110 is turned on, the UPS 110 provides power for the audio visual apparatus 130. When the AC power source fails, if the UPS 110 detects the audio visual apparatus 130 being on and the status of battery 126 reaches a default value, the UPS 110 sends the second command code with the wireless transceiver module 114 to turn off the audio visual apparatus 130. At this time, since the UPS 110 is still on, the audio visual apparatus 130 has enough time to be turned off before the energy of the battery 126 runs out. For example, the control unit 128 detects the battery 126. When the voltage of the battery 126 is reduced to a default value or the battery 126 provides energy for a default period, the control unit 128 sends a second command code with the wireless transceiver module 114. When the current detecting unit 112 detects the audio visual apparatus 130 being turned off, the UPS 110 is turned off.

The control unit 128 is, for example, a microprocessor having data storage function to perform the described procedure. In fact, the procedure can be performed by a firmware. The embodiment is not limited to it.

Second Embodiment

Figure 2:
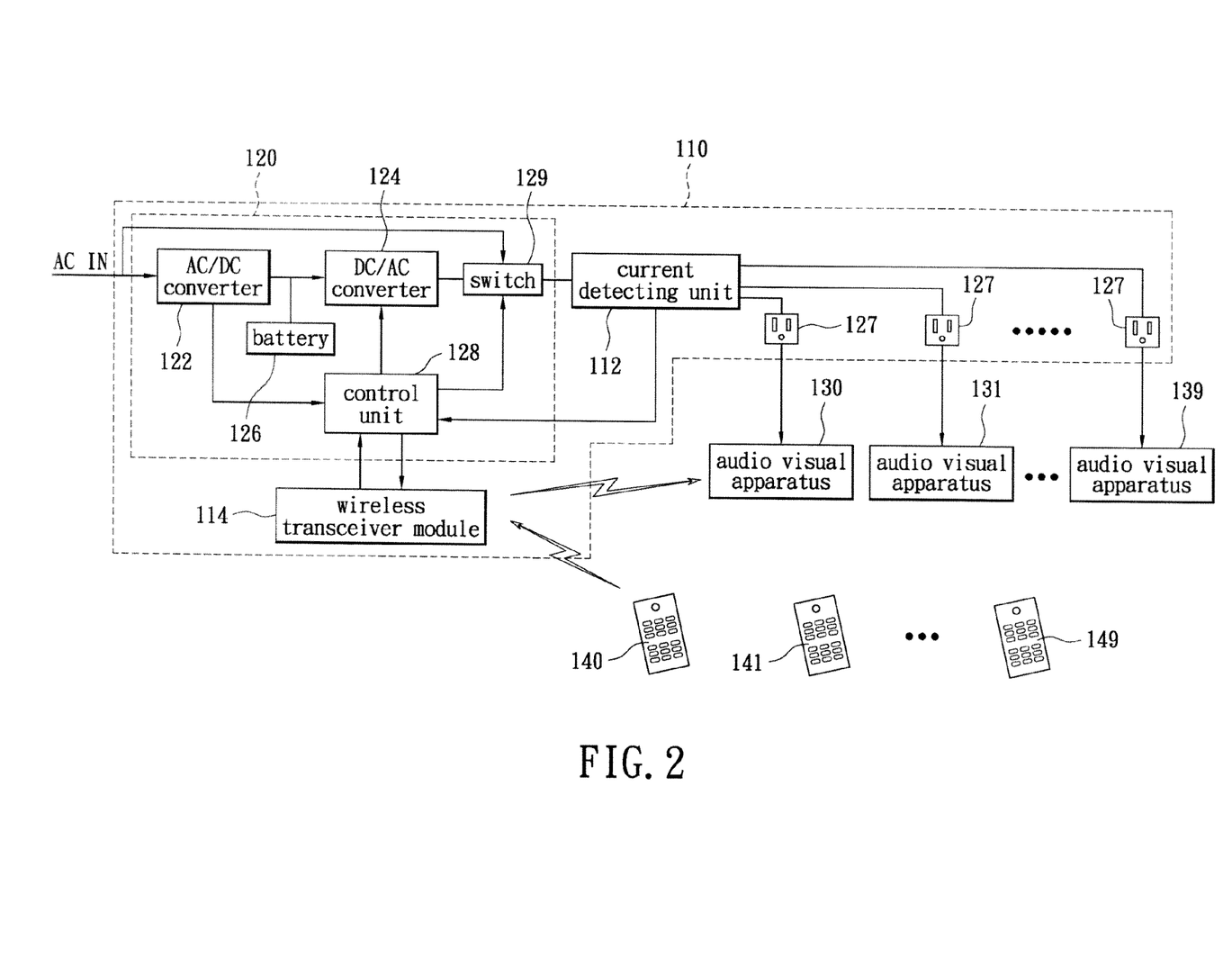
FIG. 2 is a block diagram showing the second embodiment of a UPS of the invention for an audio visual apparatus.

Referring to FIG. 2, FIG. 2 is a diagram showing the second embodiment of a UPS of the invention for an audio visual apparatus. The UPS 110 has a plurality of power output port 127 to supply power to a plurality of audio visual apparatuses 130~139. The current detecting unit 112 detects the load current of the UPS 110. The power management unit 120 determines that the audio visual apparatuses 130~139 are on or off according to the detected load current. The UPS 110 has a first command code codes and a plurality of second command codes. The first command code controls the UPS 110 on or off, and the second command codes control the audio visual apparatuses 130~139 off. The first and second command codes can be defined by a manufacturer in advance. The first and second command codes can also be defined by a user or learned by the UPS 110 via a wireless transceiver module 114 from a plurality of remote controllers 140~149 operated by a user. The UPS 110 is controlled to be on or off according to the first command code from the remote controller 140. When the UPS 110 detects the audio visual apparatuses 130~139 being off and the battery 126 has low power, the UPS 110 sends the second command codes to turn off the audio visual apparatuses 130~139 one by one. At this time, since the UPS 110 is still on, the audio visual apparatus 130 has enough time to be turned off before the energy of the battery 126 runs out.

In addition, in this embodiment, a plurality of current detecting units 112 is provided. For example, the current detecting units 112 are connected to the output of the power output ports 127 respectively. The power management unit 120 determines that the audio visual apparatuses 130~139 are on or off according to the load currents detected by the current detecting units 112. When the current detecting unit 112 detects the corresponding audio visual apparatus 130 being on and the battery 126 has low power, the UPS 110 sends the second command codes with the wireless transceiver module 114 to turn off the audio visual apparatuses 130. When the current detecting unit 112 detects the audio visual apparatuses 130, 131, 139 being on and the battery 126 has low power, the UPS 110 sends the second command codes to turn off the audio visual apparatuses 130, 131 and 139 one by one.

Third Embodiment

Figure 3:
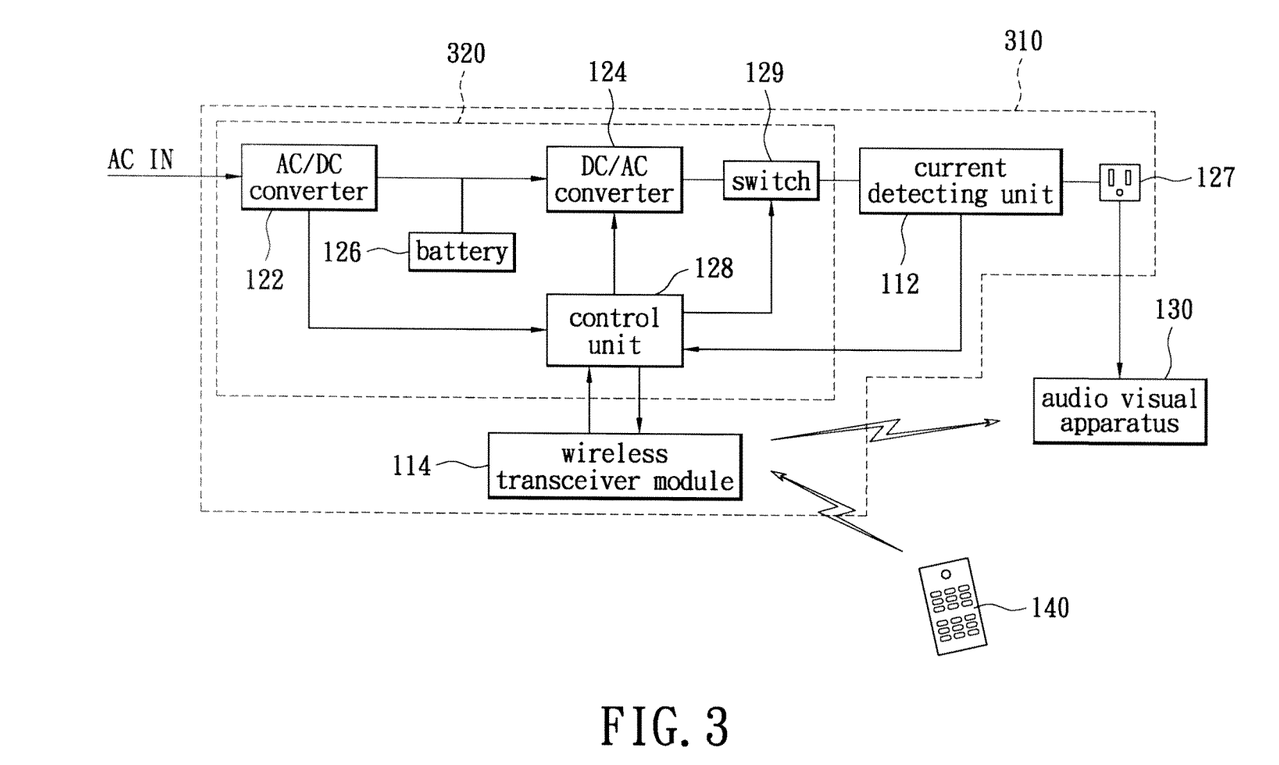
FIG. 3 is a block diagram showing the third embodiment of a UPS of the invention for an audio visual apparatus.

The structure of the power management unit is not limited to FIG. 1, wherein the power management unit 120 comprises an on-line UPS or line-interactive UPS. FIG. 3 shows the third embodiment of a UPS of the invention for an audio visual apparatus. The AC power source of the power management 320 is not coupled to the switch 129. The power output of the UPS 310 is through the AC/DC converter 122 and DC/AC converter 124 to provide stable power.

Fourth Embodiment

Figure 4:
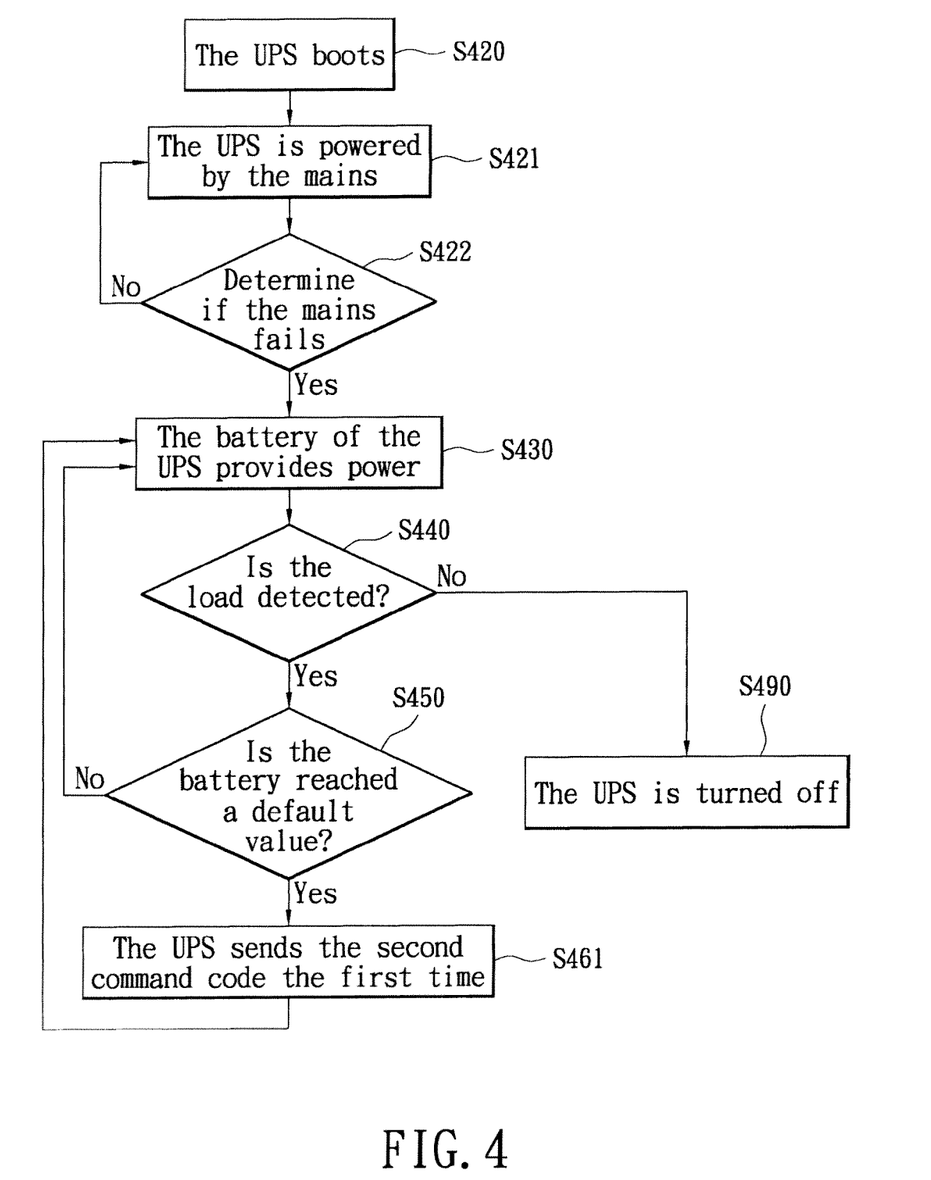
FIGS. 4 to 6 are float charts of an embodiment of a power management method of the invention.
Figure 5:
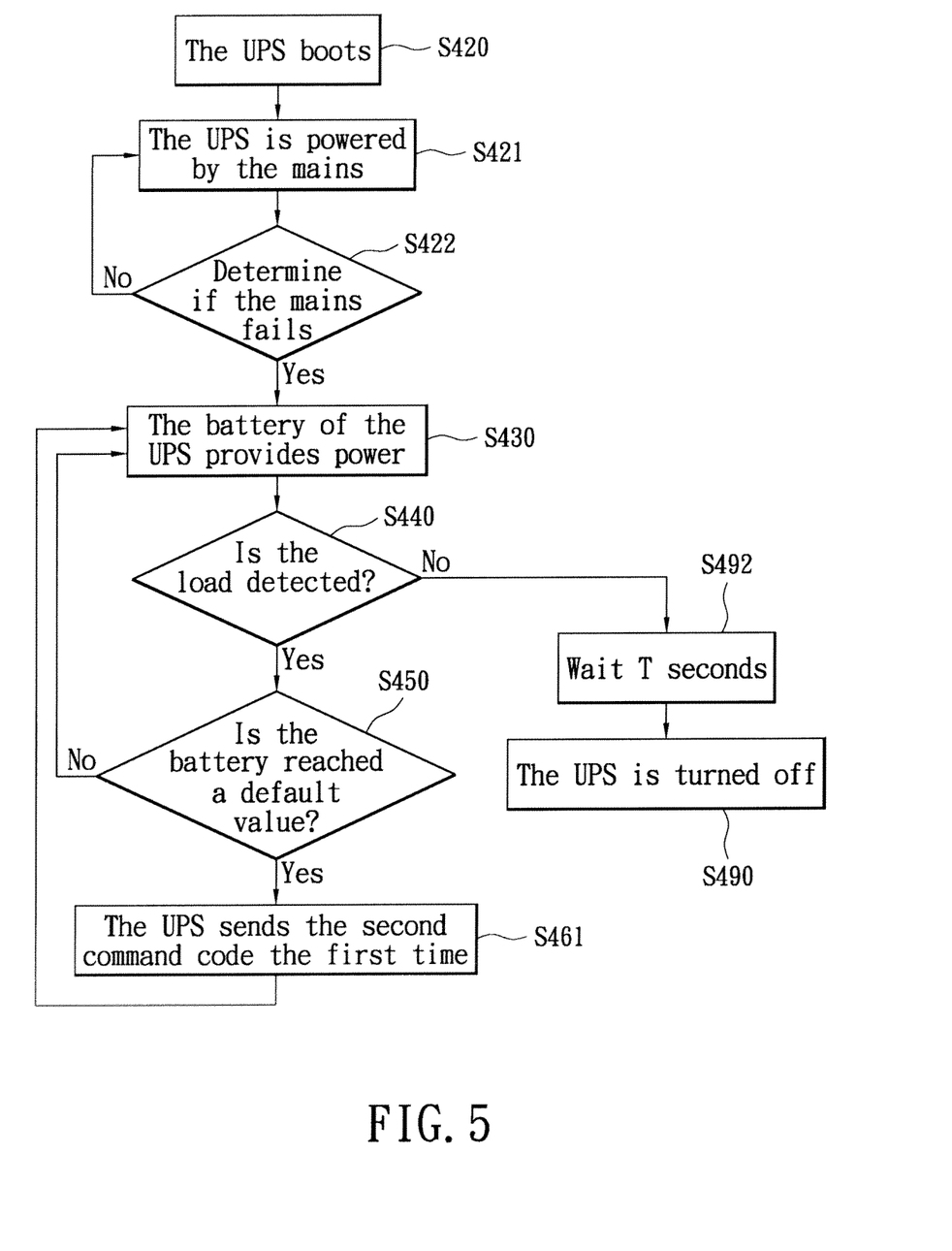
Figure 6:
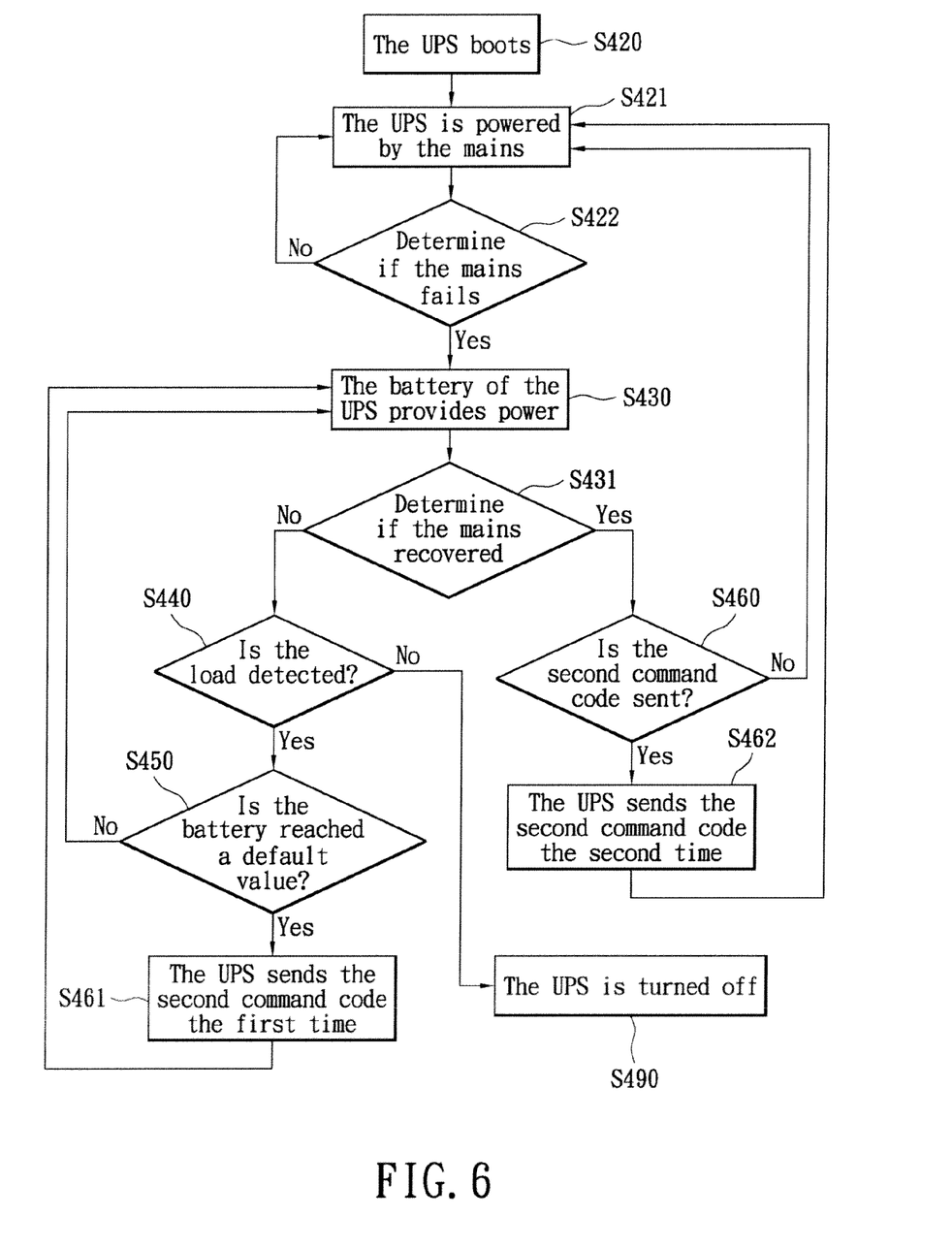

The invention can be summarized as a first power management method. Referring to FIGS. 4-6, FIGS. 4 to 6 are float charts of the fourth embodiment of a power management method of the invention. In the step S420, the UPS 110 is booted manually or by the first command code sent from the remote controller 140. In the step S421, the UPS 110 provides power to the audio visual apparatuses 130 from the mains. In the step S422, the control unit 128 determines that the mains fails or not. If the mains does not fail, the step S421 continues. If the mains fails, then enter the step S430, wherein the audio visual apparatuses 130 is powered by the battery 126. In the step S440, the current detecting unit 112 detects the load to determine the audio visual apparatuses 130 is on or off. If no load is detected, then enter the step S490, wherein the UPS 110 is turned off automatically. If the load is detected, then enter the step S450, wherein the control unit 128 determines if the status of battery 126 reaches a default value, for example, the battery voltage is lower than a value or the power supply continues a predetermined period. If the default is not reached, then the step S430 continues. If the default value is reached, then enter the step S461, wherein the control unit 128 sends the first command code with the wireless transceiver module 114 to turn off the audio visual apparatus 130. At this time, the audio visual apparatus 130 is powered by the battery 126.

Referring to FIGS. 1 and 5, the power management method may further comprise a step S492 before the step S490, wherein it enters S490 after T seconds. When no load is detected, the control unit 128 may save the number of the control unit 128 sending the second command code in T seconds, record the power supply data, failure period of mains or battery condition of the battery 126.

Referring to FIGS. 1 and 6, the power management method further comprises a step S431 between the step S430 and S440 to determine if the mains is repowered. If the mains are repowered, then enter the step S460 to determine if the second command code is sent. If the second command code is never sent, which means that the audio visual apparatus 130 is still on, then enter the step S421, wherein the audio visual apparatus 130 is powered by mains. If the second command code is already sent, then enter the step S462, wherein the control unit 128 sends the second command code again to reboot the audio visual apparatus 130, and the step S421 continues, wherein the audio visual apparatus 130 is powered by mains.

This embodiment is applicable to all types of remote controller, for example, in the step S420, once a remote controller sends a command code, the UPS 110 is booted without exception.

Fifth Embodiment

Figure 7:
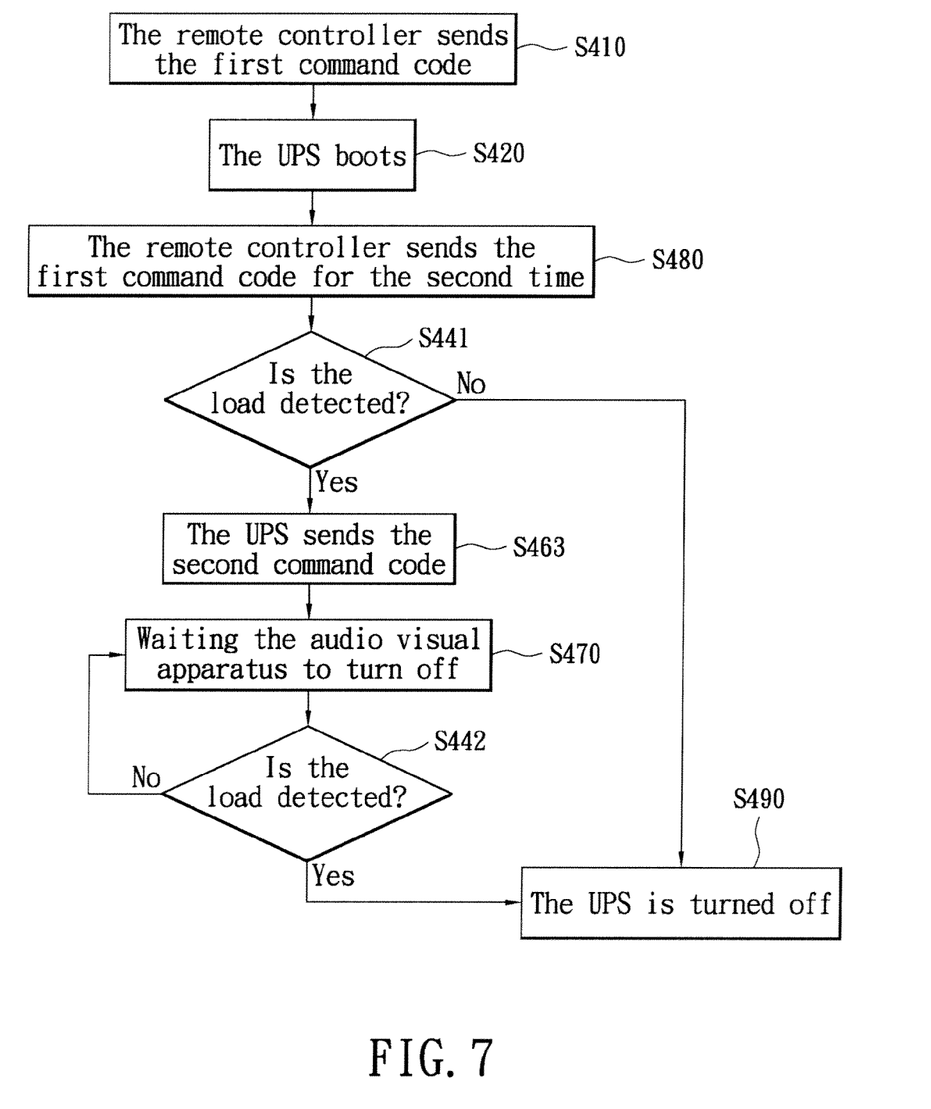
FIG. 7 is a float chart of another embodiment of a power management method of the invention.

The invention can also be summarized as a second power management method. Referring to FIGS. 1 and 7, the remote controller 140 cannot turn off the UPS 110 when the audio visual apparatus 130 is still on. In the step S410, the remote controller 140 sends a first command code. In the step S420, the UPS 110 is booted according to the first command code (for the first time). In the step S480, the remote controller 140 sends a first command code again (for the second time). At this time, the UPS 110 is not turned off immediately, and it enters the step S441 to detect if the load exits to determine if the audio visual apparatus 130 is on. If no load is detected, then enter the step S490 to turn off the UPS 110. If the load is detected, then enter the step S463, wherein the control unit 128 sends the second command code via the wireless transceiver module 114 to turn off the audio visual apparatus 130 first, and next enter the step S470 to wait until the audio visual apparatus 130 is turned off. Then enter the step S442 to detect the load with the current detecting unit 112. If no load is detected, then enter the step S490 to turn off the UPS 110. If the load is detected, then enter the step S470, wherein the UPS 110 is on until the audio visual apparatus 130 is turned off.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A uninterruptable power supply suitable for an audio visual apparatus, comprising:
   a AC/DC converter coupled to an AC power source;
   a DC/AC converter coupled to the AC/DC converter;
   a battery coupled to the AC/DC converter and the DC/AC converter;
   a power output port coupled to an output of the DC/AC converter;
   a current detecting unit coupled to the power output port and the DC/AC converter;
   a control unit coupled to the AC/DC converter, the DC/AC converter and the current detecting unit; and
   a wireless transceiver module coupled to the control unit, wherein the power output port is connected to the audio visual apparatus, the control unit detects a load current via the current detecting unit, and a command code controlling the audio visual apparatus is saved in the control unit, and when the AC power source fails, if the control unit detects the audio visual apparatus being on and the battery status reaches a default value, then the control unit sends the command code via the wireless transceiver module.

2. The uninterruptable power supply as claimed in claim 1, wherein the command code is saved in the control unit in advance or input manually, and the default value of the battery status is a voltage value or a period of power supply.

3. The uninterruptable power supply as claimed in claim 1, wherein the command code is received from a remote controller via the wireless transceiver module and saved in the control unit, and the default value of the battery status is a voltage value or a period of power supply.

4. The uninterruptable power supply as claimed in claim 1, wherein the wireless transceiver module is an infrared module, a RF module, a RF4CE module or a blue tooth module, and the uninterruptable power supply is an on-line UPS, an off-line UPS or a line-interactive UPS.

5. The uninterruptable power supply as claimed in claim 1, wherein the uninterruptable power supply has a plurality of power output ports to connect to a plurality of audio visual apparatuses, and a plurality of command codes are saved in the control unit to control each of the audio visual apparatuses.

6. A power management method for an uninterruptable power supply used for an audio visual apparatus, the power management method at least comprising the following steps:
   a. booting the uninterruptable power supply which is connected between a mains and the audio visual apparatus;
   b. supplying AC power converted from a battery of the uninterruptable power supply to the audio visual apparatus when the mains fails;
   c. detecting whether a load exists, wherein in the step c, the uninterruptable power supply detects a load current by a current detecting unit and determines whether the load exists by a control unit, and if the load doesn't exist, then the uninterruptable power supply is turned off, and if the load exists, then enter the next step;
   d. detecting a status of the battery, wherein in the step d, the uninterruptable power supply determines whether the status of the battery reaches a default value by the control unit, and if the status of the battery doesn't reach the default value, then return to the step b to supply the AC power converted from the battery to the audio visual apparatus, and if the status of the battery reaches the default value, then enter the next step;
   e. sending a command code to control the audio visual apparatus by the uninterruptable power supply, wherein in the step e; the uninterruptable power supply sends the command code by a wireless transceiver module to turn off the audio visual apparatus and enter the step b to supply the AC power converted from the battery to the audio visual apparatus, wherein the default value is a voltage value or a period of power supply.

7. The power management method as claimed in claim 6, wherein in the step c, if the load doesn't exist, then the uninterruptable power supply is turned off after T seconds to save the sending frequency of the command code in the control unit and to record the power supply data, time when the mains fails, or condition of the battery.

8. The power management method as claimed in claim 6 further comprising a step a1, between the step a and the step b, providing the AC power to the audio visual apparatus from the mains directly, and when the mains fails, enter the step b to supply the AC power converted from a battery of the uninterruptible power supply, which is an off-line UPS, to the audio visual apparatus.

9. The power management method as claimed in claim 6 further comprising a step b1, between the step b and the step c, detecting whether the mains recovers from the failed status, and if the mains doesn't recover, then enter the step c, and if the mains recovers, then determine whether the command code has been sent, and if the command code hasn't been sent, then the uninterruptable power supply provides power for the audio visual apparatus, and if the command code had been sent, then the command code will be sent again to reboot the audio visual apparatus and supplies the power to the audio visual apparatus continuously by the uninterruptable power supply.

10. The power management method as claimed in claim 6, wherein in the step a, the uninterruptable power supply is booted manually or by a remote controller, and the control unit has a first command code controlling the boot of the uninterruptable power supply and a second command code controlling the boot of the audio visual apparatus, and the first and second command codes are learned from a remote controller.

11. The power management method as claimed in claim 6, wherein in the step a, the uninterruptable power supply is booted from any remote controller, wherein the uninterruptable power supply is turned on when receiving any command code from any one of all types of remote controllers.

12. A power management method for an uninterruptable power supply used for an audio visual apparatus, the power management method comprising the following steps:
   a. sending a first command code from a remote controller;

b. booting the uninterruptable power supply which is connected between a mains and the audio visual apparatus, wherein the uninterruptable power supply receives the first command code via a wireless transceiver module;
c. sending a first command code from a remote controller again, wherein the uninterruptable power supply detects a load current by a current detecting unit after receiving the first command code and determines whether the load exists by a control unit, and if the load doesn't exist, then the uninterruptable power supply is turned off, and if the load exists, then enter the next step;
d. sending a second command code by the wireless transceiver module to turn off the audio visual apparatus, wherein the second command code is saved in a control unit of the uninterruptable power supply;
e. waiting for the audio visual apparatus to turn off, wherein in the step e, the uninterruptable power supply detects the load exists, and if the load doesn't exist, then the uninterruptable power supply is turned off, and if the load exists, the uninterruptable power supply still waits for the audio visual apparatus to turn off.

* * * * *